United States Patent [19]
Denton et al.

[11] Patent Number: 5,217,749
[45] Date of Patent: Jun. 8, 1993

[54] METHOD OF MAKING POLYMER THIN FILMS FOR OPTICAL USES

[75] Inventors: Denice D. Denton; Jeffrey A. Tobin, both of Madison, Wis.

[73] Assignee: Wisconsin Alumni Research Foundation, Madison, Wis.

[21] Appl. No.: 765,077

[22] Filed: Sep. 24, 1991

[51] Int. Cl.$^5$ ............................................... B05D 3/06
[52] U.S. Cl. .................................... 427/488; 427/162; 427/294
[58] Field of Search ................................. 427/38, 162

[56] References Cited

U.S. PATENT DOCUMENTS 3,822,928  7/1974  Smolinsky et al. ........... 350/96 WG

OTHER PUBLICATIONS

Booth, Bruce L., "Low Loss Channel Waveguides in Polymers," 7 *J. of Light Wave Technology* 1445–1453 (Oct., 1989).
Cross, G. H., et al., "Polymeric Integrated Electro-Optic Modulators," 1177 *Integrated Optics and Optoelectronics* 79–91 (1989).
Davies, David H., et al., "Optical Application of Plasma Polymer Films," PMSE abstract.
McDonach, A., et al., "Polymeric Guided Wave Optics," 1177 *Integrated Optics and Optoelectronics* 67–78 (1989).
Ramey, Delvan A., "Polymer Waveguide Fabrication Techniques," 517 *Integrated Opt. Circuit Engineering* 106–109 (1984).
Schlotter, N. E., et al., "Fabrication of Channel Waveguides in Polydiacetylenes: Composite Diffused Glass/Polymer Structures," 56 *Appl. Phys. Lett.* 13–15 (Jan., 1990).
Sullivan, Charles T. and Anis Husain, "Guided-Wave Optical Interconnects for VLSI Systems," 881 *Opt. Computing and Nonlinear Materials* 172–176 (1988).
Szeto, R. and D. W. Hess, "Correlation of Chemical and Electrical Properties of Plasma-Deposited Tetramethylsilane Films," 52 *J. Appl. Phys.* 903–908 (Feb., 1981).
Thompson, L. F. and G. Smolinsky, "A Scanning Electron Microscope Study of Plasma-Polymerized Organosilicon Films Suitable for use as Lightguides. A Determination of the Cause of Signal Attenuation," *J. Appl. Polymer Science* 1179–1190 (1972).
Tien, P. K. and R. Ulrich, "Theory of Prism-Film Coupler and Thin-Film Light Guides," 60 *J. Opt. Soc. Am.* 1325–1337 (Oct., 1970).
Tien, P. K. and R. J. Martin, "Experiments on Light Waves in a Thin Tapered Film and a New Light-Wave Coupler," 18 *Appl. Phys. Lett.* 398–401 (May, 1971).
Tien, P. K., "Light Waves in Thin Films and Integrated Optics," *Appl. Opt.* 2395–2413 (Nov., 1971).
Tien, P. K., et al., "Formation of Light-Guiding Interconnections in an Integrated Optical Circuit by Composite Tapered-Film Coupling," 12 *Appl. Opt.* 1909–1916 (Aug., 1973).
Tien, P. K., et al., "Modes of Propagating Light Waves in Thin Deposited Semiconductor Films," 14 *Appl. Phys. Lett.* 291–294 (May, 1969).
Ulrich, R. and R. J. Martin, "Geometrical Optics in Thin Light Guides," 10 *Appl. Opt.* 2077–2085 (Sep., 1971).
Vasile, M. J. and G. Smolinsky, "Organosilicon Films Formed by an RF Plasma Polymerization Process," 119 *J. Electrochem. Soc.* 451–455 (Apr., 1972).
Walpita, L. M., "Organic Materials in Future Integrated Opto-Electronic Circuits," 1177 *Integrated Optics and Optoelectronics* 58–66 (1989).

*Primary Examiner*—Bernard Pianalto
*Attorney, Agent, or Firm*—Quarles & Brady

[57] ABSTRACT

A method is disclosed for the deposition of plasma films in which the optical index of refraction of the deposited film can be varied continuously or discontinuously as the material is deposited. The change in refractive index is accomplished by changing the input power applied to the plasma chamber. The method can be used to create optical wave guides from material of a single input monomer vapor.

6 Claims, 3 Drawing Sheets

METHOD OF MAKING POLYMER THIN FILMS FOR OPTICAL USES

STATEMENT REGARDING FEDERALLY SPONSORED RESEARCH

This invention was made with United States government support awarded by the National Science Foundation (NSF), Grant #ECD-8721545. The United States Government has certain rights in this invention.

FIELD OF THE INVENTION

The present invention relates to the deposition of polymer films for use in optics, in general, and relates in particular, to methods for making multiple layer polymer thin films of layers having different refractive indices, which multilayer films may be used as optical wave guides or in optical integrated circuitry.

BACKGROUND OF THE INVENTION

Thin film light guides or wave guides are planar elements intended for utilization in optical circuitry or other optoelectronic devices which require light transmission as part of their operation. The developments in the field of such thin film devices have led to the belief that thin film technology will eventually lead to integrated optical circuits and devices comparable to those currently available based on microelectronic integrated electrical circuits.

In order to achieve a thin film wave guide or light guide, a layer of transparent material having a higher index of refraction must be flanked by materials having a lower index. This can be done by making sandwiched layers of low-high-low index, or by placing a layer or film of material on a substrate with a lower index (i.e. glass) and having the upper surface exposed to the surrounding media (i.e. air) having a lower index. The materials typically used for thin film devices have been metal or semiconductive oxides and nitrides such as silicon dioxide, silicon nitride, aluminium oxide, titanium dioxide and zinc oxide to name a few. Some older research focussed on organic polymers polymerized from monomers, but this technique has not been widely developed by the art. Semiconductor or inorganic films have been deposited by various means, a common one of which is PECVD or plasma enhanced chemical vapor deposition. This process is typically used with inorganic materials, which are deposited onto substrates at relatively high temperatures (above 150° C.). Polymer film layers have been studied as potential optical waveguides.

One area of early research was the use of organic materials to make optical films. Such organic films may be deposited by glow-discharge polymerization, or "plasma polymerization," but the process is significantly different from PECVD, particularly in its temperature requirement, since this process may be performed at room temperature (25° C.) without heating of the substrate. The plasma polymerization method can yield films free of holes or discontinuities and which are mechanically and chemically tougher than typical conventional polymers.

As described above, if a film of material of homogeneous index of refraction is to be used as a wave guide, it must have a higher index than the surrounding materials. This is necessary to that light approaching the boundaries of index decrease is reflected back into the film of the wave guide, so that the light propagates down the film. If the material is not homogenous as to wider of refraction, i.e. has multiple layers or varying material, then it is desirable to have a region of higher index somewhere in the interior of the film which confines the light. A smoothly varying index of refraction is the most desirable since reflections from sharp discontinuities in index lose more energy than occurs in the path bending of light which occurs with a smoothly graded index charge. Of the methods previously known for producing optical thin films, few can produce materials with smoothly varying index of refraction.

Therefore, the prior art is generally cognizant of the concept of making polymer thin films by deposition of monomers from a plasma onto a substrate. For example, a system of making such a thin film light guide circuit is described in U.S. Pat. No. 3,822,928. In the method for fabricating such circuitry disclosed in that patent, layers of different refractive indices are created by forming the thin polymer films from vapors of two separate monomers which are plasma polymerized in a common plasma and deposited jointly on the substrate. By varying the relative proportions between the two monomers, the relative proportions of the monomers' contribution to the overall polymeric film can be varied. The variation in the constituent monomers in the film creates a difference in index of refraction. Thus, the refractive index desired in any particular layer is achieved by making variations of the proportions between the two monomers used to create the film as a part of the fabrication process.

SUMMARY OF THE INVENTION

The present invention is summarized in that a method for fabricating polymer thin films with layers of variable refractive indices includes the steps of introducing into a vacuum chamber which includes a ground electrode and a powered electrode and also a ground shield surrounding the side of the powered electrode away from the ground electrode a quantity of an organic monomer, introducing a radio frequency electrical field between the electrodes to induce a plasma from the gas monomer in the chamber under conditions which favor deposition of the monomer on the electrodes as a thin film optical layer; and varying the power applied to the electrodes so as to vary the refractive index of the material being deposited on the electrodes.

It is an object of the present invention to provide a methodology for the fabrication of optical thin film wave guides using the plasma deposition process with a minimum amount of manipulation of the process while achieving variation in the refractive index in the material deposited during different parts of the process of deposition.

It is another object of the present invention to provide an optical wave guide consisting of a polymerized film formed from a single monomer which varies in refractive index across its depth, the variation in refractive index being achieved by varying power applied during the plasma deposition of the material of the wave guide.

Other objects, advantages and features of the present invention will become apparent from the following specification when taken in conjunction with the accompanying drawings.

DESCRIPTION OF THE PREFERRED EMBODIMENT

The present invention is directed toward a method for fabricating polymer thin films for use in optical circuits such as optical wave guides, which is fabricated by deposition of a plasma monomer onto a substrate to create an optical thin film. What has been found here is that by simple variations in the input of power applied between the electrodes in the plasma producing apparatus, the characteristics of the deposited material can be varied in such a way that the index of refraction of the material changes as it is being deposited. By this procedure, a material having regions of differing indices of refraction can be created in a continuous manufacturing process. This makes possible the creation of thin film wave guides from a single monomeric input simply by varying the power applied to the apparatus during the deposition of the film on a substrate.

The films made by this process may not be true polymers, in the sense that the word is most often used, i.e. repeating similar units of a single monomer. Instead, the monomer molecules are broken apart by the energy of the plasma and the fragments thus created are joined into a unitary film of interlinked molecules. The resulting films are referred to as polymeric films here, since that is the nomenclature used in the field.

In general, the prior art is generally cognizant of the fact that many organic monomers may be deposited by plasma deposition in a vacuum to create optically transparent thin film materials for use in wave guides and other optical circuitry. While the example described below uses the monomer methyl methacrylate, any other suitable organic monomer which may be deposited as an optically transparent film may be utilized within this process. Other monomers which are known to form similar films include a variety of aliphatic and aromatic organic compounds including ethers, alcohols, halogenated hydrocarbons, ketones and silicones.

Figure 1:
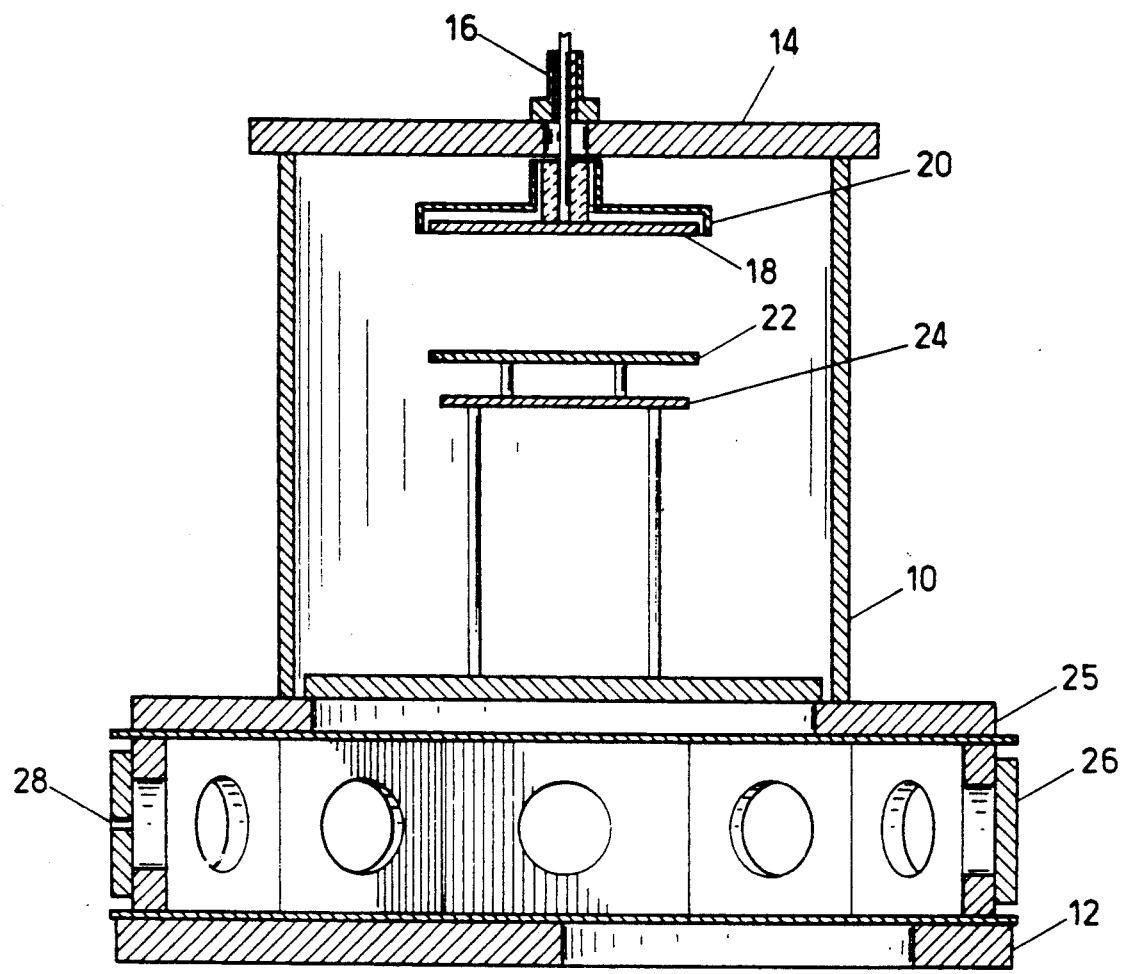
FIG. 1 is a side cross-sectional view of a plasma deposition chamber for performing the process of the present invention.

The plasma polymerization process requires the use of a plasma chamber which is under a vacuum and is capable of imposing a radio frequency (RF) electric field to create a plasma and to induce plasma deposition upon a substrate placed upon one of the electrodes. Shown in FIG. 1 is a suitable apparatus for use as a reaction chamber 10 in this process. The reaction chamber 10 is a cylindrical Pyrex chamber placed ultimately upon a base plate 12. The chamber is sealed by a lid 14, through which a conductor 16 extends connecting to an electrode 18. The electrode 18, in this embodiment, serves as the powered electrode. A ground shield 20 surrounds the powered electrode and is grounded to the case and also to the electrical ground from which the RF power is supplied. Directly below the upper electrode 18 is a lower electrode 22 which serves as the ground electrode. The ground electrode 22 is supported on a mounting bar 24 elevated above an aluminum feed-through flange 25. The feed-through flange 25 is mounted upon a feed-through collar 26, containing a series of ports 28 to which gas fittings may be attached. The feed-through collar 26 rests on the base plate 12, which has a suitable opening in it for connection to one or more vacuum pumps. The seal between the feed-though collar and the base plate 12 is made with a 0-ring. The Pyrex cylinder 10 is sealed at both ends with Viton L-gaskets. Below the base a vacuum pump (not shown) is placed which is capable of drawing a vacuum through the vacuum port to the interior of the apparatus 10.

The parallel plate electrodes consisting of the upper electrode 18 and the lower electrode 22 are six inch diameter aluminum plates. The upper electrode is capacitively coupled to an RF Plasma Products 1 Kw, 13.56 megahertz power supply. The lower electrode is connected to ground. The electrodes are spaced approximately three inches apart. The impedance of the electrodes was matched with an RF Plasma Products manual matching network. The RF power supply to the electrodes was continuously monitored with a Bird thruline wattmeter (model no. 4385-832), placed in line between the power supply and the matching network. Two vacuum pumps were connected through to the interior of the chamber 10.

During the operation of the device, the monomer was fed as a vapor through suitable gas handling apparatus connected to the aluminum feed-through collar 26. Methyl methacrylate vapor (MMA) was created from a liquid source (Aldrich 80-62-6). The liquid MMA monomer was heated to develop the desired flow rate of vaporous material into the system. The gas lines were heated to prevent condensation. The flow of the gaseous monomer into the system was controlled with an Applied Materials model 550 mass flow controller. The pressure in the system was continually monitored with an MKS Baratron model 127 capacitance manometer.

In the procedures described below, the plasma deposited optical thin films are deposited upon a substrate. The substrate used was silicon wafers. The wafers were cleaned ultrasonically, and placed on the lower or grounded electrode. Any other suitable solid planar substrate could also be used.

An important parameter for the optimization of the process is the use of a grounded shield around the powered electrode, such as the ground shield 20 shown in FIG. 1. While a variation in refractive index can be achieved by varying input power even in a system without a ground shield, the use of a ground shield accentuates the effect. The theoretical explanation is that the ground shield concentrates the RF power, and therefore the plasma, in the space directly between the electrodes and inhibits leakage of plasma to other parts of the chamber. While there is an electric field between the powered electrode and the ground shield, but the space between them is insufficient for the plasma to develop there. With no plasma, little or no current flows, and thus little power is lost. The RF power is therefore coupled effectively to the plasma. In any event, regardless of the reason, experimentation has demonstrated that much greater variation of the refractive index of the resulting deposited film is achieved using the ground shield.

EXAMPLES

Figure 4:
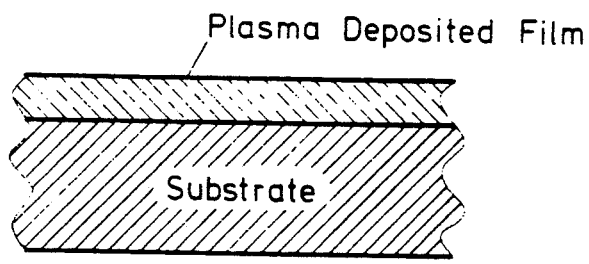
FIG. 4 illustrates the resulting wave guide film made by the process of the present invention.
Figure 5:
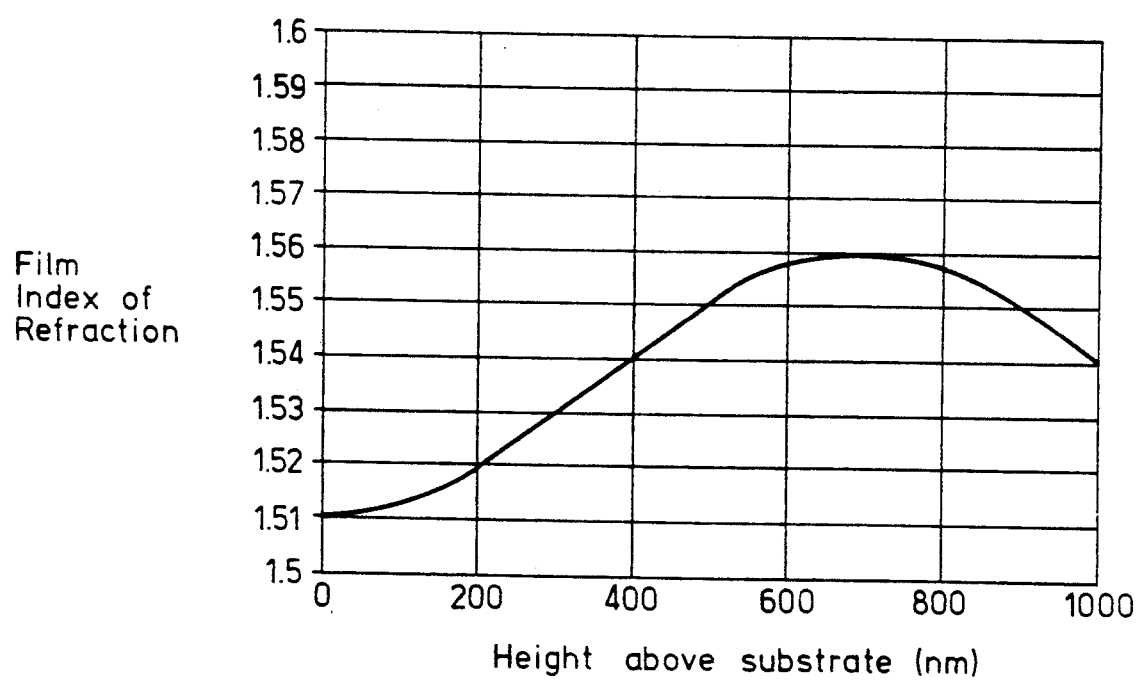
FIG. 5 is a graph intending to indicate the qualitative change in the index of refraction desired across the thickness of a thin film wave guide constructed in accordance with the present invention.

The process described here is particularly useful for making an optical wave guide. The optical thin film can be continuously deposited, and the applied RF power adjusted to obtain a film with an enhanced index of refraction in its center and a reduced index of refraction at its upper and lower surfaces, the range of indices of refraction used being sufficient to obtain light confinement in the interior of the film so that the film will function as a wave guide. FIG. 4 illustrates such a wave guide and FIG. 5 illustrates a plot of index of refraction over depth of the material. Note that while a sharp discontinuity in index of refraction could be obtained, by a quick change in power level, a gradual change is preferred as illustrated in FIG. 5. This gradation of index of refraction reduces light losses. Also note that the center area of heightened index of refraction is asymmetrically placed away from the substrate to avoid light loss to the substrate.

The phenomenon which results in this change in index of refraction is not fully understood. Perhaps it is the result of differing energy densities in the plasma causing different degrees of dissociation and ionization of the monomer vapor in the plasma. Regardless of whether or not this explanation is correct, the phenomenon is consistent and reproducible.

The process of creating the thin film wave guides began when the system was evacuated to less than 5 milliTorr using the rough vacuum pump. A diffusion pump was then used to zero the Baratron. A stable flow of the monomer vapor into the system was then established. While many valuable flow rates could be utilized, the flow rate was standardized at 20 standard cubic centimeters per minute. The pressure in the system was manually adjusted using the flow line valve to achieve a stable pressure of 60 mT. No further pressure control was performed in the system. During the deposition of the plasma polymer, the pressure was allowed to drift. Plasma formation was then initiated by the application of electrical RF power and the power was match adjusted to the desired conditions. Typical times of depositions were approximately 15 to 20 minutes.

The coated substrates were then removed from the system and analyzed with the Rudolph Instruments automated three-color ellipsometer. Analysis of the ellipsometric data was performed on an IBM PC using software supplied by the Rudolph Instruments Company. The thickness of the films was measured using a Tencor Alpha-Step Surface Profilometer. The Alpha-Step measured a scratch in the film made with a razor blade. The films were found to be much softer than the underlying native oxide in the silicon substrate so scratch removal of the films without deformation of the silicon substrate could readily be achieved.

The thickness of the desired optical films were targeted to be approximately 600 Angstroms. This thickness was selected to achieve a solution to the ellipsometric equations that would give the least amount of error. Also using the three distinct wavelengths of the three color ellipsometer helped to verify the accuracy of the experiment.

Figure 2:
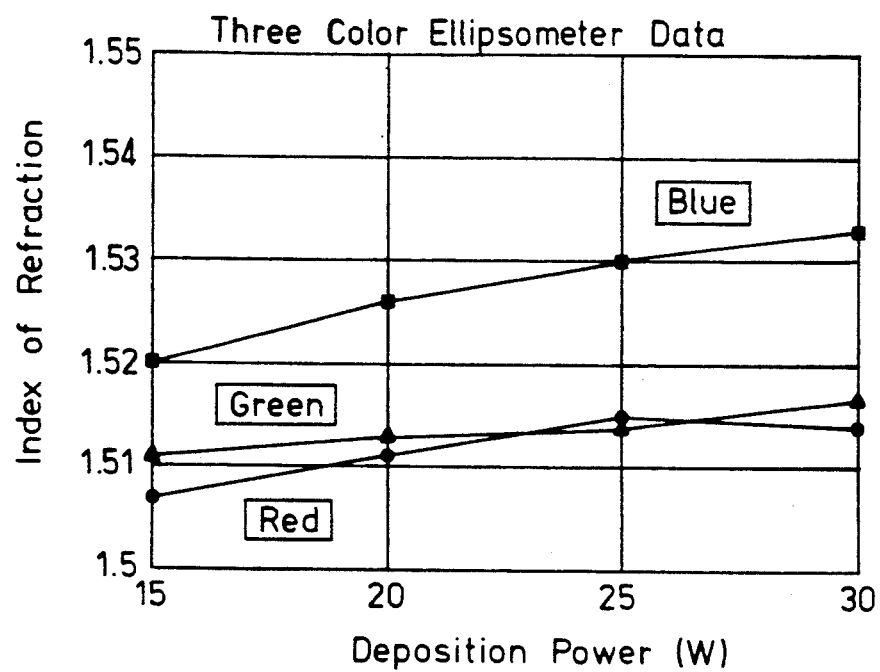
FIG. 2 is a graphical illustration of the effect of varying applied RF power versus index of refraction for an apparatus without a ground shield.

Shown in FIG. 2 is a graphical representation of the results obtained by multiple replicates of this process performed at a variety of power levels. The data presented in FIG. 2 is the three color ellipsometer data from MMA films deposited in the apparatus of FIG. 1 operated at 110 milliTorr without a ground shield. The power level was varied between 15 and 30 watts. The MMA monomer was introduced into the chamber at 20 standard $cm^3$/min. The deposition was performed over 15 minutes. The results clearly demonstrate increasing refractive index with a proportional increase in applied RF power to the plasma chamber.

Figure 3:
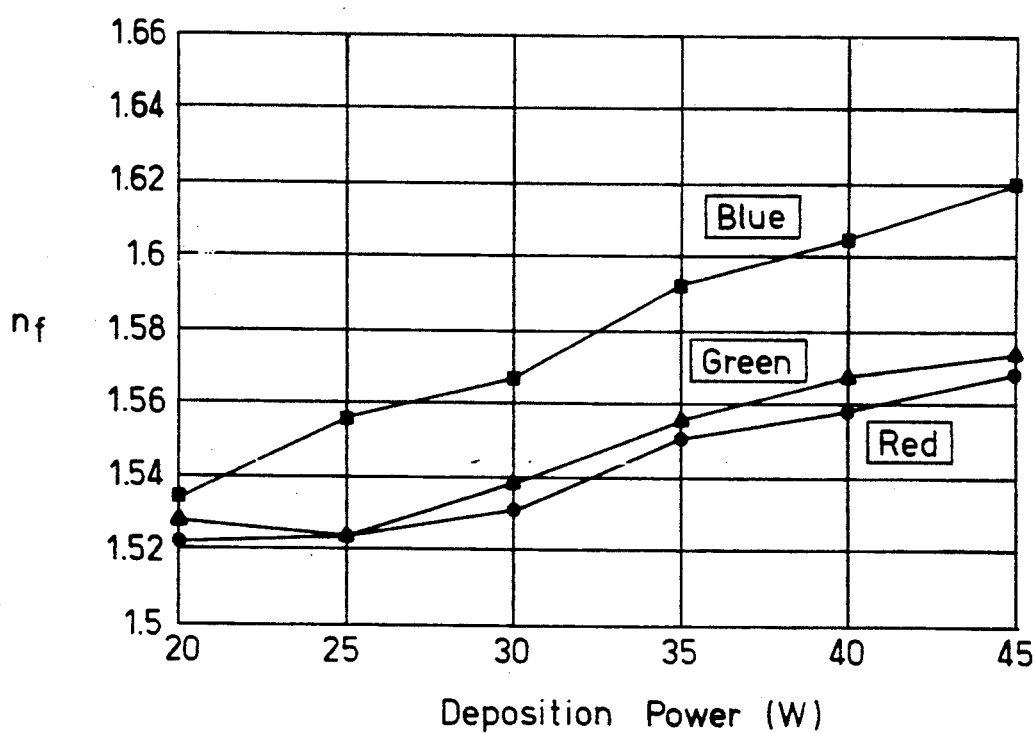
FIG. 3 is a graphical illustration of the relationship between the applied RF power and the index of refraction of the deposited material using the apparatus of FIG. 1.

Shown in FIG. 3 is a graph of similar results obtained by a similar replicates performed with a ground shield on the powered electrode. In these replicates, the MMA was again supplied at 20 standard $cm^3$/min. The apparatus was operated over 20 minutes at an initial base pressure of 60 milliTorr prior to vapor introduction. The results presented in FIG. 3 make it clear that there is a wide variation in index of refraction dependent on the level of applied power. The variation also is significantly greater than that measured when the ground shield was not used.

I claim:

1. A method for the creation of organic optical thin films of varying index of refraction comprising the steps of
   (a) drawing a vacuum in a plasma chamber including a pair of spaced electrodes;
   (b) introducing an organic monomer vapor into the chamber;
   (c) applying a first level of radio frequency electric power to one of the electrodes under conditions favoring creation of a plasma from the monomer vapor and the deposition of the monomer vapor as a film on at least one of the electrodes; and
   (d) varying the level of the power applied to the electrode to vary the refractive index of the film being deposited.

2. A method as claimed in claim 1 wherein the chamber includes a ground shield around the powered electrode.

3. A method as claimed in claim 1 wherein a substrate is placed on one of the electrodes so that deposition occurs on the substrate.

4. A method as claimed in claim 3 wherein the substrate is placed upon the grounded electrode.

5. A method as claimed in claim 1 wherein the monomer vapor is methyl methacrylate.

6. A method as claimed in claim 1 wherein the density of the plasma in the chamber is also varied to vary the index of refraction in the film.

* * * * *